United States Patent
Jung et al.

(10) Patent No.: US 9,258,768 B2
(45) Date of Patent: *Feb. 9, 2016

(54) METHOD FOR USING LEGACY WI-FI AND WI-FI P2P SIMULTANEOUSLY

(71) Applicant: Samsung Electronics Co., Ltd., Suwon-si, Gyeonggi-do (KR)

(72) Inventors: Bu-Seop Jung, Suwon-si (KR); Jung-Hun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/575,184

(22) Filed: Dec. 18, 2014

(65) Prior Publication Data
US 2015/0105023 A1    Apr. 16, 2015

Related U.S. Application Data

(63) Continuation of application No. 13/606,667, filed on Sep. 7, 2012, now Pat. No. 8,929,822.

(30) Foreign Application Priority Data

Sep. 14, 2011    (KR) .................. 10-2011-0092509

(51) Int. Cl.
| | | |
|---|---|---|
| *H04B 7/00* | (2006.01) | |
| *H04W 48/16* | (2009.01) | |
| *H04W 76/02* | (2009.01) | |
| *H04W 4/00* | (2009.01) | |
| *H04W 52/02* | (2009.01) | |
| *H04W 16/20* | (2009.01) | |
| *H04W 16/22* | (2009.01) | |
| *H04W 28/02* | (2009.01) | |
| *H04W 84/18* | (2009.01) | |
| *H04W 8/00* | (2009.01) | |
| *H04W 88/06* | (2009.01) | |

(52) U.S. Cl.
CPC .............. *H04W 48/16* (2013.01); *H04W 4/008* (2013.01); *H04W 52/0241* (2013.01); *H04W 52/0261* (2013.01); *H04W 76/023* (2013.01); *H04W 8/005* (2013.01); *H04W 16/20* (2013.01); *H04W 16/225* (2013.01); *H04W 28/021* (2013.01); *H04W 84/18* (2013.01); *H04W 88/06* (2013.01)

(58) Field of Classification Search
USPC ............. 455/127.4, 426.1, 432.1, 434, 435.1, 455/435.2, 436, 525, 552.1, 553.1, 160.1; 370/331–334
See application file for complete search history.

(56) References Cited

U.S. PATENT DOCUMENTS

| | | | |
|---|---|---|---|
| 6,108,542 A * | 8/2000 | Swanchara et al. | ........... 455/434 |
| 8,325,610 B2 * | 12/2012 | Fischer | ......................... 370/236 |
| 8,493,992 B2 | 7/2013 | Sella et al. | |
| 2007/0234402 A1* | 10/2007 | Khosravi et al. | ................... 726/2 |

(Continued)

*Primary Examiner* — Dominic E Rego
(74) *Attorney, Agent, or Firm* — Jefferson IP Law, LLP

(57) ABSTRACT

A method for using legacy Wi-Fi and Wi-Fi Peer-to-Peer (P2P) simultaneously is provided. The method includes entering a device discovery process of Wi-Fi P2P, if use of a Wi-Fi P2P function is requested while using a legacy Wi-Fi function, acquiring a Group Owner (GO) right of Wi-Fi P2P in the device discovery process, performing a listen state over the same channel as a channel where the legacy Wi-Fi function is in use, through the acquisition of the GO right, and performing a search state over a social channel of Wi-Fi P2P, and repeating the listen state and the search state until the device discovery process is ended.

22 Claims, 7 Drawing Sheets

(56) References Cited

U.S. PATENT DOCUMENTS

| | | |
|---|---|---|
| 2008/0009267 A1* | 1/2008 | Ramos Robles et al. ..... 455/411 |
| 2008/0248763 A1* | 10/2008 | Park et al. .................... 455/90.2 |
| 2009/0245152 A1* | 10/2009 | Hsu et al. ...................... 370/311 |
| 2010/0322213 A1 | 12/2010 | Liu et al. |
| 2011/0034127 A1 | 2/2011 | Wentink et al. |
| 2011/0059779 A1* | 3/2011 | Thomas et al. ............... 455/574 |
| 2011/0082939 A1 | 4/2011 | Montemurro et al. |
| 2011/0134882 A1* | 6/2011 | Aoyama et al. ............... 370/331 |
| 2011/0161697 A1 | 6/2011 | Qi et al. |
| 2011/0167114 A1* | 7/2011 | Blanchard et al. ........... 709/204 |
| 2011/0199993 A1* | 8/2011 | Yen et al. ..................... 370/329 |
| 2012/0179789 A1* | 7/2012 | Griot et al. ................... 709/220 |
| 2012/0258715 A1* | 10/2012 | Souissi et al. ................ 455/436 |
| 2013/0182686 A1* | 7/2013 | Vedantham et al. .......... 370/336 |
| 2014/0141714 A1 | 5/2014 | Ghosh et al. |
| 2015/0087310 A1* | 3/2015 | Santhanam et al. .......... 455/436 |

* cited by examiner

METHOD FOR USING LEGACY WI-FI AND WI-FI P2P SIMULTANEOUSLY

PRIORITY

This application is a continuation application of a prior application Ser. No. 13/606,667, filed on Sep. 7, 2012, which claimed the benefit under 35 U.S.C. §119(a) of a Korean patent application filed in the Korean Intellectual Property Office on Sep. 14, 2011 and assigned Serial No. 10-2011-0092509, the entire disclosure of each of which is hereby incorporated by reference.

BACKGROUND OF THE INVENTION

1. Field of the Invention

The present invention relates to a method for ensuring performance of Wi-Fi. More particularly, the present invention relates to a method for minimizing degradation in performance of legacy Wi-Fi when a legacy Wi-Fi function and a Wi-Fi Peer-to-Peer (P2P) function are used simultaneously.

2. Description of the Related Art

Wireless communication based on legacy Wi-Fi was developed to provide Internet access through Access Points (APs) and is thus unable to provide direct communication among devices supporting a Wi-Fi function. Therefore, an advanced function called Wi-Fi P2P or Wi-Fi Direct has been proposed in order to provide a direct communication function among Wi-Fi devices.

Wi-Fi P2P technology, proposed by the Wi-Fi Alliance, is compatible with the legacy Wi-Fi, and allows devices supporting the Wi-Fi function to access each other for communication without need of an AP.

Although the inter-device direct communication function is similar to the function provided in technology such as Bluetooth, the Wi-Fi P2P function is rapidly replacing Bluetooth because Wi-Fi P2P has many advantages over Bluetooth in terms of coverage and data rate. For example, while Bluetooth 4.0, the latest Bluetooth standard, supports a maximum coverage of 100 m and a maximum data rate of 24 Mbps, Wi-Fi Direct supports a maximum coverage of 200 m and a maximum data rate of 300 Mbps.

Wireless communication based on the legacy Wi-Fi includes a scheme called Ad-hoc mode, which supports direct connection. Actually, however, the Ad-hoc mode is rarely used due to its many disadvantages such as security vulnerabilities, increase in power consumption, and transmission bandwidth limitation of 11 Mbps.

Because the Wi-Fi P2P function takes into account the compatibility with the conventional Wi-Fi function or the legacy Wi-Fi function, a user may attempt a Wi-Fi P2P connection while using the legacy Wi-Fi function. For example, the user may request execution of the Wi-Fi P2P function for the purpose of file sharing, while his or her mobile terminal is operating in a legacy Wi-Fi station mode where it may be provided with a communication function by being connected to a specific AP.

However, in the legacy Wi-Fi station mode, if the Wi-Fi P2P function is executed, performance of the legacy Wi-Fi may be degraded. Therefore, there is a need for a method capable of preventing performance degradation of the legacy Wi-Fi during the execution of the Wi-Fi P2P function while the legacy Wi-Fi is in use.

Since an understanding of the overall operation of the Wi-Fi P2P should precede an understanding of the degradation in performance of the legacy Wi-Fi, the cause of problems and a means for addressing the problems will be presented based on the below-described details for implementing the present invention.

SUMMARY OF THE INVENTION

Aspects of the present invention are to address at least the above-mentioned problems and/or disadvantages and to provide at least the advantages described below. Accordingly, an aspect of the present invention is to provide a method for preventing degradation in performance of legacy Wi-Fi during execution of a Wi-Fi Peer-to-Peer (P2P) function when a P2P device capable of supporting Wi-Fi P2P technology is using legacy Wi-Fi (i.e., when the P2P device is connected to a specific Access Point (AP) with a legacy Wi-Fi STA interface).

In accordance with an aspect of the present invention, a method for using legacy Wi-Fi and Wi-Fi P2P simultaneously is provided. The method includes entering a device discovery process of Wi-Fi P2P, if use of a Wi-Fi P2P function is requested while using a legacy Wi-Fi function, acquiring a Group Owner (GO) right of Wi-Fi P2P in the device discovery process, performing a listen state over the same channel as a channel where the legacy Wi-Fi function is in use, through the acquisition of the GO right, and performing a search state over a social channel of Wi-Fi P2P, and repeating the listen state and the search state until the device discovery process is ended.

In accordance with another aspect of the present invention, a method for using legacy Wi-Fi and Wi-Fi P2P simultaneously is provided. The method includes acquiring a GO right of Wi-Fi P2P, if an entry into a listen mode of Wi-Fi P2P is requested during execution of a legacy Wi-Fi station mode, and entering the listen mode over the same channel as a channel where the legacy Wi-Fi function is in use, through the acquisition of the GO right.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
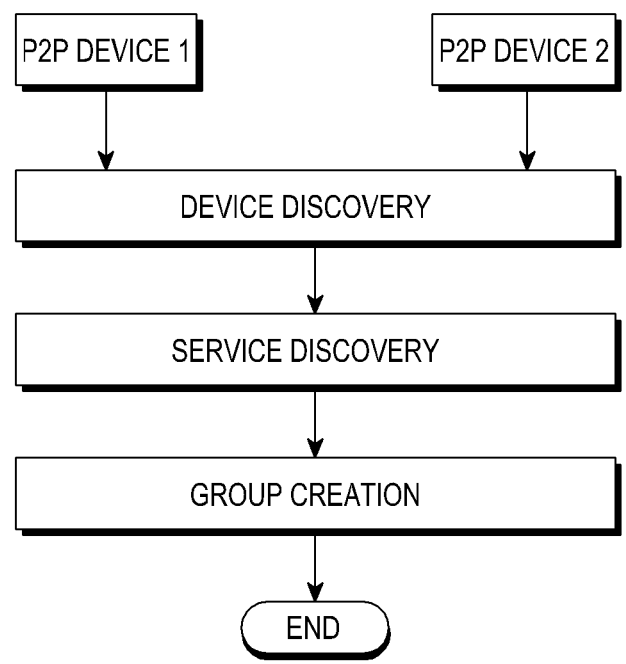
FIG. 1 is a flowchart schematically illustrating a process of creating a Peer-to-Peer (P2P) group through execution of a Wi-Fi P2P function according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A Wi-Fi Peer-to-Peer (P2P) function is provided by devices (e.g., a P2P device 1 and a P2P device 2) supporting the Wi-Fi P2P function by creating a Wi-Fi P2P group.

Prior to a description of the problem that performance of a legacy Wi-Fi station mode is degraded when a Wi-Fi P2P function is enabled while the legacy Wi-Fi station mode is in use, and of an exemplary method and apparatus to address the problem, a process of creating a P2P group will be described below with reference to FIG. 1 which is a flowchart schematically illustrating a process of creating a P2P group through execution of a Wi-Fi P2P function according to the related art.

Creation (or formation) of a Wi-Fi P2P group may be achieved by three processes: Device Discovery, Service Discovery, and Group Creation. These processes will be described below in order.

Device Discovery

A device discovery process is a procedure needed when Wi-Fi P2P devices (e.g., P2P devices 1 and 2) identify each other and configure a connection in order to create a Wi-Fi P2P group with a function of Wi-Fi P2P (or Wi-Fi Direct).

A Wi-Fi P2P device (e.g., P2P device 1 or P2P device 2 shown in FIG. 1), which has entered a device discovery mode as a result of a menu selection to use a Wi-Fi Direct function (or Wi-Fi P2P function) or as a predetermined application is executed, discovers surrounding Wi-Fi P2P devices by repeating Channel Scan, Listen and Search according to the Institute of Electrical and Electronics Engineers (IEEE) 802.11 standard at intervals of a predetermined time.

A basic operation of the device discovery procedure performed in the Wi-Fi P2P group creation process is performed by exchange of Probe Request and Probe Response messages of an IEEE 802.11 Media Access Control (MAC) protocol. Probe Request includes information such as P2P a Information Element (IE), a Wi-Fi Simple Configuration (WSC) IE and a Supplemental Registration (Supp Reg) IE, and Probe Response includes information such as a P2P IE, a WSC IE, a Robust Secure Network (RSN) IE and a Supp Reg IE.

Service Discovery

Service discovery may be performed between the above-described device discovery process and a below-described group creation process. The service discovery process is performed to provide a function in which each P2P device supporting the Wi-Fi P2P function exchanges information about its available services by identifying its supportable service protocols and services through exchange of request and response messages.

For example, assuming that the P2P device 1 is a camera and the P2P device 2 is a printer, when a user of the P2P device 1 wants to print out a photo, the P2P device 1 may determine whether a photo output function of the P2P device 2 is available, through the service discovery, because the P2P device 1 needs to determine whether the P2P device 2 supports a photo output function.

For example, assuming that file sharing between the P2P device 1 and the P2P device 2 is requested through creation of a Wi-Fi P2P group, if the P2P device 1 uses a file sharing scheme based on Universal Plug and Play (UPNP) whereas the P2P device 2 uses a file sharing scheme based on Web Service (WS), the service discovery process should be performed because file sharing between the two devices may not be achieved.

Group Creation

In Wi-Fi P2P, in order to create a Wi-Fi P2P group, P2P devices (e.g., P2P device 1 and P2P device 2) perform Provision Discovery, which is one of the important features defined in the specification of Wi-Fi Direct (or Wi-Fi P2P).

To use the Wi-Fi P2P function, P2P devices basically operate based on WSC, e.g., based on WPS. WSC support of a connection device is optional in the legacy Wi-Fi standard, but mandatory in Wi-Fi Direct.

WSC, which is a function provided for more convenient wireless connection, includes a Push Button Configuration (PBC) scheme in which a button should be pushed, and a Personal Identification Number (PIN) scheme in which a PIN number should be input. For both the PBC scheme and the PIN scheme, settings should be completed within 120 seconds, which results in an inconvenience. For example, in the case of the PBC scheme, a WSC Registration Protocol may start only when a WPS button is input or pushed in the other party's device within 120 seconds after one device requested wireless connection using the PBC scheme. The devices exchange Service Set Identify (SSID) and credentials (which is the total sum of cryptographic information, and includes information such as authentication type, encryption type, network key and ssid) needed for connection.

A standard newly defined in Wi-Fi Direct to relieve these inconveniences of the conventional WSC is the Provision Discovery scheme. In the Provision Discovery scheme, when a predetermined Wi-Fi P2P device (e.g., P2P device 1) attempts a connection based on the conventional WSC (PBC scheme or PIN scheme) after discovering another Wi-Fi P2P device (e.g., P2P device 2), the Wi-Fi P2P device informs another Wi-Fi P2P device's user of its connection attempt by sending a WSC Configuration Method message.

The WSC Configuration Method message is classified into different types such as PBC, PIN from Display, and PIN from Keypad. In PBC, another Wi-Fi P2P device's user receives a button input, and PIN from Display and PIN from Keypad may inform another Wi-Fi P2P device's user of the Wi-Fi P2P connection attempt by an event where a pin number is displayed or input on another Wi-Fi P2P device.

If Provision Discovery is completed as users of the P2P device 1 and the P2P device 2 accept the Wi-Fi P2P connection, a Group Owner Negotiation process is performed between the Wi-Fi P2P devices. Since Wi-Fi P2P needs to determine or set a Group Owner (GO) that will play a central role in the created Wi-Fi P2P group, the Group Owner Negotiation process for determining a Wi-Fi P2P device that will serve as GO, is needed for use of the Wi-Fi P2P function.

The Group Owner Negotiation process is performed by exchange of GO Negotiation Request, GO Negotiation Response, and GO Negotiation Confirm frames. GO Negotiation Request and GO Negotiation Response include P2P IE information and WSC IE information, respectively. A field of the P2P IE includes information such as P2P Capability, P2P Device Info, Group Owner Intent, Configuration Timeout, Listen Channel, Extended Listen Timing, Intended P2P Interface Address, Channel List, and Operating Channel attributes. A field of the WSC-IE includes information such as DEVICE PASSWORD ID, MANUFACTURER, MODEL NAME, MODEL NUMBER, SERIAL NUMBER, and DEVICE NAME.

Each of the P2P device 1 and the P2P device 2 compares Group Owner Intent included in the P2P IE. A device with greater Group Owner Intent is determined as GO, while a device with less Group Owner Intent is determined as a Group Client (GC). If the P2P device 1 and the P2P device 2 are determined as GO and GC, respectively, after completion of the Group Owner Negotiation process, the device set as GO operates as a WSC registrar and the device set as GC operates as a WSC enrollee If Provisioning for exchanging credentials is completed, a group setup process for forming a Wi-Fi P2P group is completed.

In the Group Owner Negotiation process, attributes of the P2P group are also determined. The attributes of the P2P group are classified into Temporary Groups and Persistent Groups. A Temporary Group corresponds to a P2P group formed to be used only once, and a Persistent Group corresponds to a P2P group formed to be used persistently.

If the created P2P group is set as a persistent group, P2P devices in the P2P group store credentials and information about the roles (i.e., GO or GC) of the P2P devices in the P2P group, and omit processes such as Provision Discovery, Group Owner Negotiation and Provisioning upon request to form a P2P group in the future, thereby quickly forming the P2P group, contributing to the improvement of the connection speed. For example, if a device discovered in Device Discovery is a device belonging to a P2P group previously formed as a persistent group, a device corresponding to GO may create a P2P group through exchange of information (e.g., Invitation request/response) including information about the attributes of the P2P group, and a device corresponding to GC may quickly access the P2P group based on the credentials stored therein.

Thereafter, if the group creation process is completed, the GO device moves to an operating channel and starts its role as GO, and the GC device accesses the GO based on the credentials identified by Provisioning. Finally, the two P2P devices are connected to the Wi-Fi P2P group.

Based on the details described in connection with the creation of a Wi-Fi P2P group, the problem will be described below that performance of legacy Wi-Fi is degraded when a Wi-Fi P2P function is executed while the legacy Wi-Fi function is in use.

The degradation in performance of legacy Wi-Fi during execution of the Wi-Fi P2P function in the legacy Wi-Fi station mode may occur in the device discovery process described in conjunction with FIG. 1. A first degradation in performance of legacy Wi-Fi during execution of a Wi-Fi P2P function in a legacy Wi-Fi station mode will be described below with reference to FIG. 2.

Figure 2:
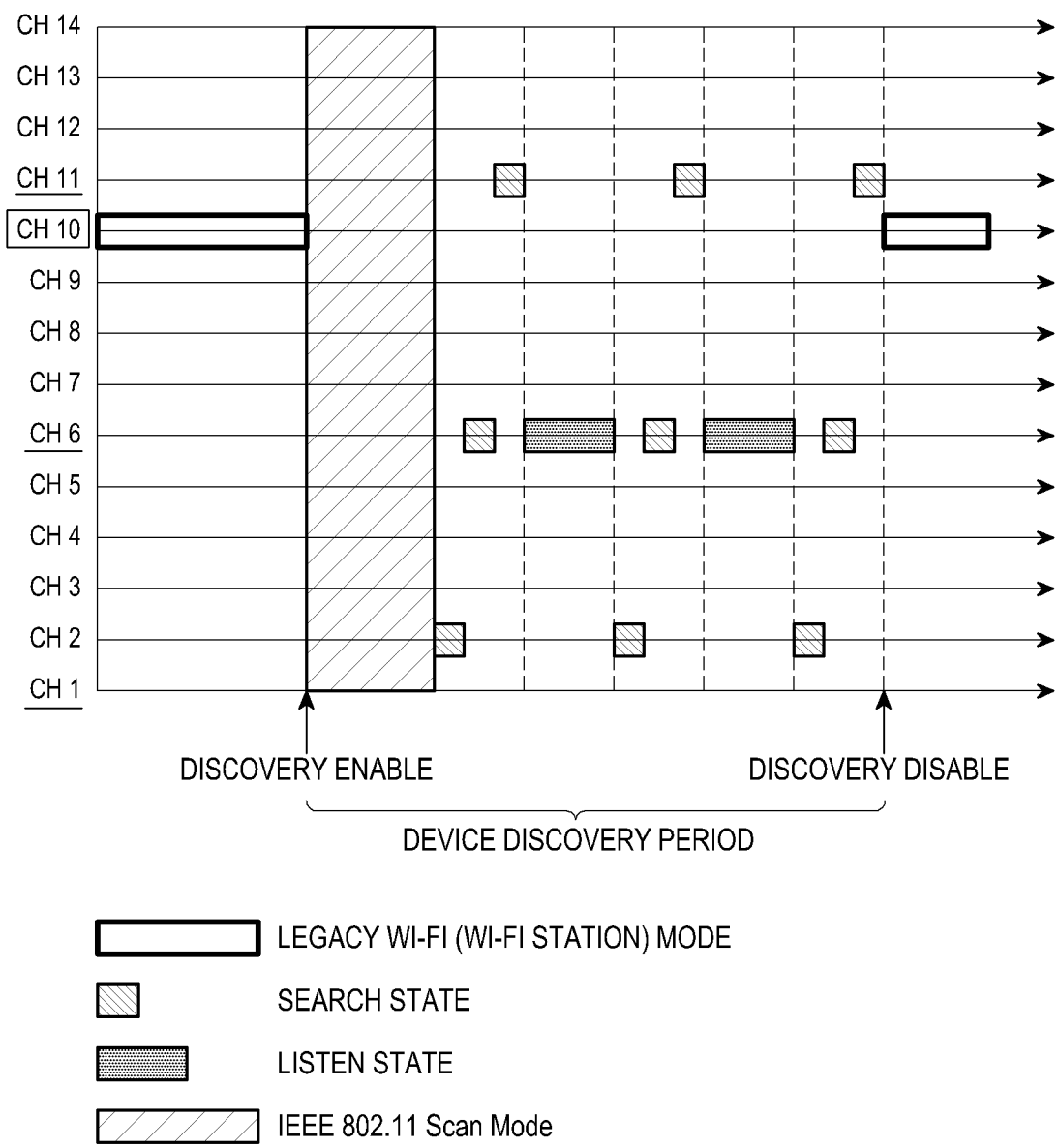
FIG. 2 illustrates a first degradation in performance of legacy Wi-Fi during execution of a Wi-Fi P2P function in a legacy Wi-Fi station mode according to the related art.

FIG. 2 illustrates a first degradation in performance of legacy Wi-Fi during execution of a Wi-Fi P2P function in a legacy Wi-Fi station mode according to the related art.

Referring to FIG. 2, it is assumed that a legacy Wi-Fi station mode is in progress over a Channel #10 (CH10) among the channels set up for Wi-Fi communications. Upon request for execution of a Wi-Fi P2P function, a P2P device enters a device discovery period where it discovers its surrounding P2P devices.

In the Wi-Fi P2P Specification, the device discovery process discovers surrounding P2P devices by scanning all channels using a channel scan method (e.g., IEEE 802.11 scan mode, or IEEE 802.11 channel scan method) defined in the IEEE 802.11 standard.

If the IEEE 802.11 channel scan method is used, an Access Point (AP) of legacy Wi-Fi (legacy Wi-Fi AP), a GO device of Wi-Fi P2P, and common P2P devices (i.e., P2P devices which are not set as GO or GC) whose roles are not determined yet, may all be discovered.

If no P2P device requiring a connection is discovered even though the IEEE 802.11 channel scan method is used, the discovery of surrounding P2P devices is continued through a search state and a listen state. In the search state, a Probe Request message may be sent, and in the listen state, a Probe Response to a Probe Request message received from another P2P device may be sent.

It is defined in the Wi-Fi P2P Direct Specification that these search and listen states may be performed using only a Channel #1 (CH1), a Channel #6 (CH6) and a Channel #11 (CH11), which are called social channels, if the P2P device is not set as GO (i.e., has no GO rights). In other words, it is defined that if no P2P devices connected to a Wi-Fi P2P group are set as GO or GC as the Group Owner Negotiation process described in conjunction with FIG. 1 is not performed, the P2P device may perform the search and listen states only over the social channels.

Therefore, upon receiving a request for execution of a Wi-Fi P2P function from a user while operating in a legacy Wi-Fi station mode using CH10, the P2P device switches from CH10 to the social channels CH1, CH6 and CH11 and performs the search and listen states, because it has not yet determined whether to operate as GO or GC.

However, in some cases, discovery of surrounding P2P devices may not be quickly completed even by the IEEE 802.11 channel scan method and the search and listen states, causing excessive consumption of time in a device discovery period where the social channels are used. As a result, it takes excessive time in switching back to CH10 and providing the legacy Wi-Fi station mode's function, causing occurrence of the phenomenon where performance of the legacy Wi-Fi function is degraded in the device discovery period.

Another example of degradation in performance of legacy Wi-Fi during execution of a Wi-Fi P2P function in a legacy Wi-Fi station mode will be described below with reference to FIG. 3.

Figure 3:
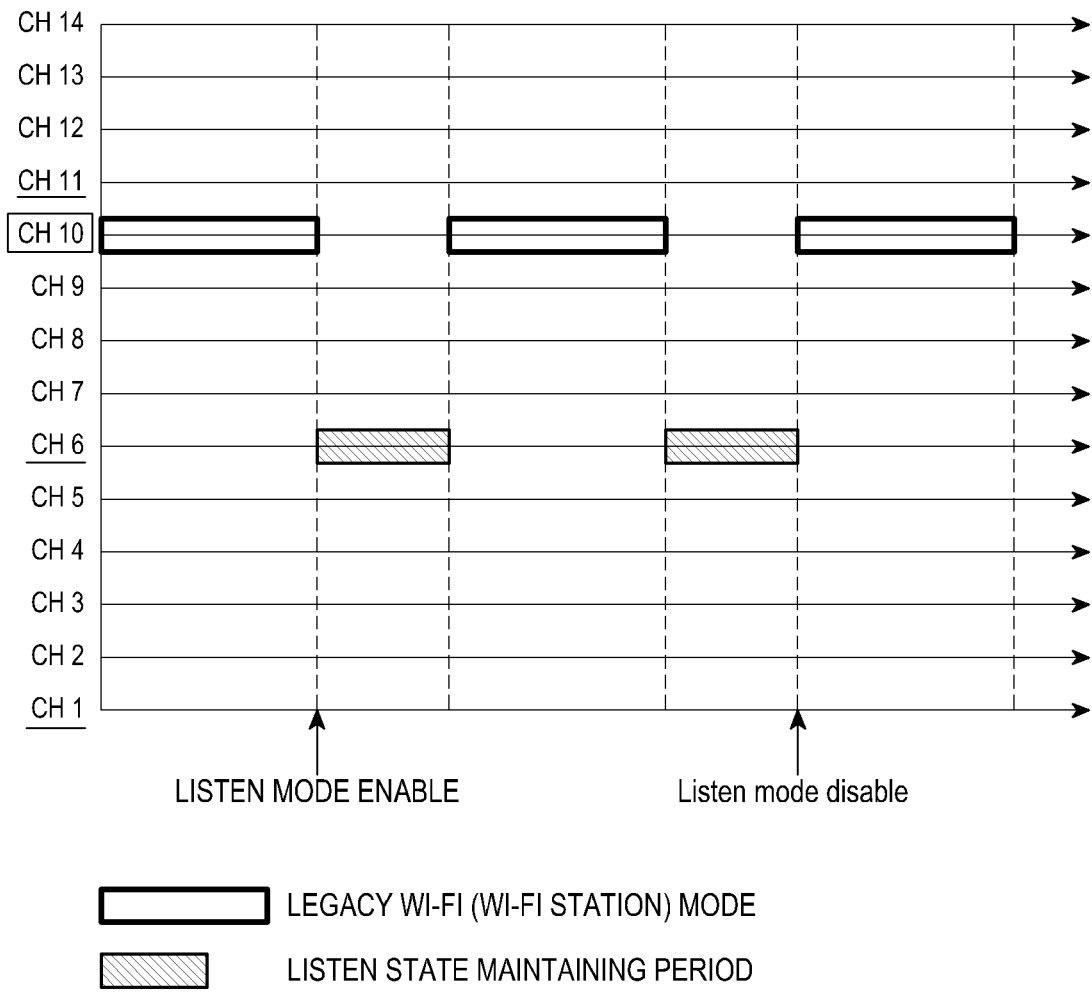
FIG. 3 illustrates a second degradation in performance of legacy Wi-Fi during execution of a Wi-Fi P2P function in a legacy Wi-Fi station mode according to the related art.

FIG. 3 illustrates a second degradation in performance of legacy Wi-Fi during execution of a Wi-Fi P2P function in a legacy Wi-Fi station mode according to the related art.

Referring to FIG. 3, the device discovery process (Discovery Modes), which is performed to use the Wi-Fi P2P function, may include a listen mode. The listen mode, in which a P2P device waits for a Wi-Fi P2P connection from the other party's P2P device, is a function that is provided by taking into account the situations in which, when a P2P device 1 is a wireless printer and a P2P device 2 is a camera and is connected by the Wi-Fi P2P function, the P2P device 1 waits for an output request from the P2P device 2.

The listen mode is performed by periodically maintaining the listen state, and, if the listen state is periodically maintained over the CH10 allocated for the legacy Wi-Fi station mode and another channel (shown as CH6 in FIG. 3), performance of the legacy Wi-Fi station mode may be degraded in the period where the listen state is maintained. For example, if the listen state is repeatedly maintained using CH6 while a streaming image is played in the legacy Wi-Fi station mode using CH10, the streaming image may not be normally played during the maintenance of the listen state.

The Wi-Fi P2P Specification provides that the P2P device may use only the social channels CH1, CH6 and CH11 if it is not set as GO (or has no GO rights) even with the listen mode. The P2P device maintains the listen state at stated periods as shown in FIG. 3 without continuously maintaining the listen mode, taking its power consumption into consideration.

Because an increase in the period to maintain the listen state may contribute to an increase in the probability of a P2P device to be discovered by another P2P device, but may cause an increase in the power consumption, the maintenance period of the listen state needs to be properly set for its optimization. For example, it is provided in the Wi-Fi P2P standard that a period to maintain the listen state is about 10% of a sleep period. However, this period may be changed by the manufacturer of the P2P devices.

Exemplary embodiments of the present invention that address the problems of the degradation in performance of legacy Wi-Fi, which have been described so far with reference to FIGS. 2 and 3, will now be described below.

Figure 4:
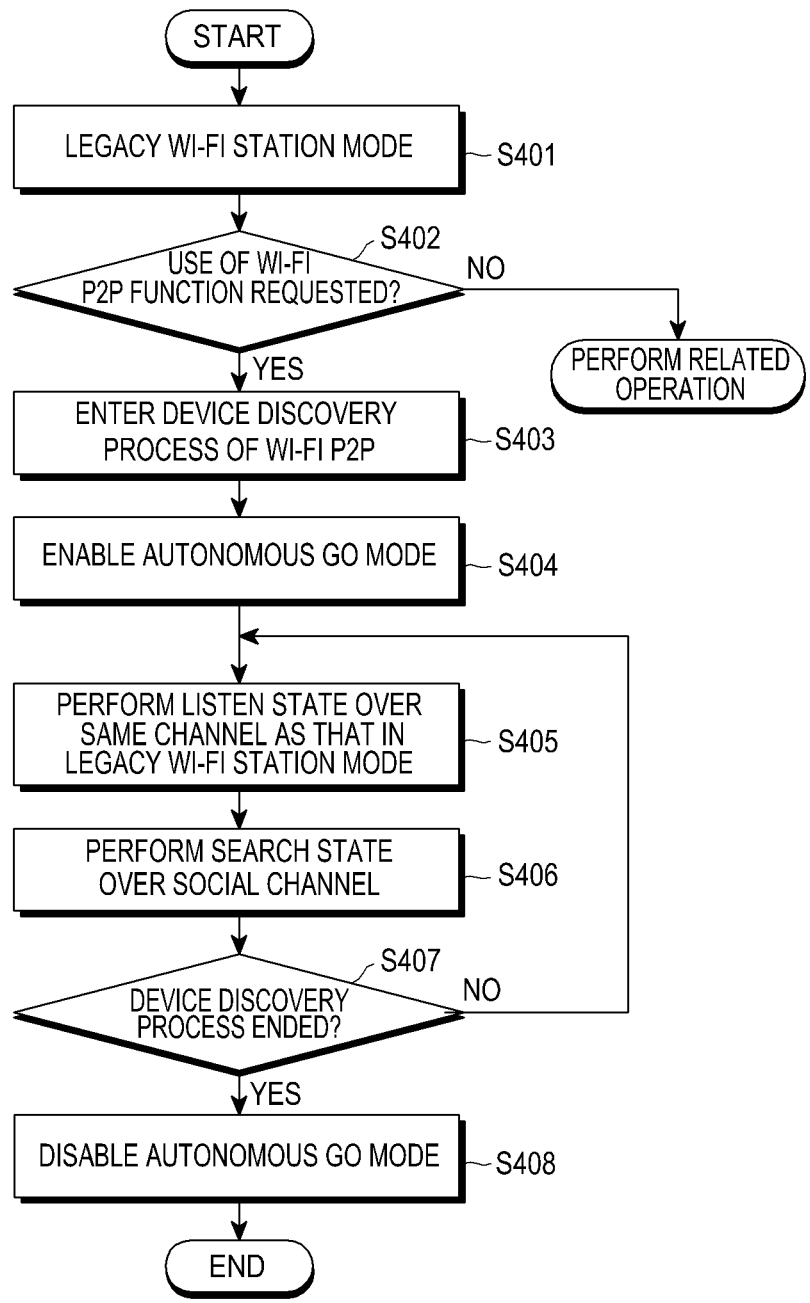
FIG. 4 is a flowchart illustrating a process of executing a Wi-Fi P2P function in a legacy Wi-Fi station mode according to an exemplary embodiment of the present invention.
Figure 5:
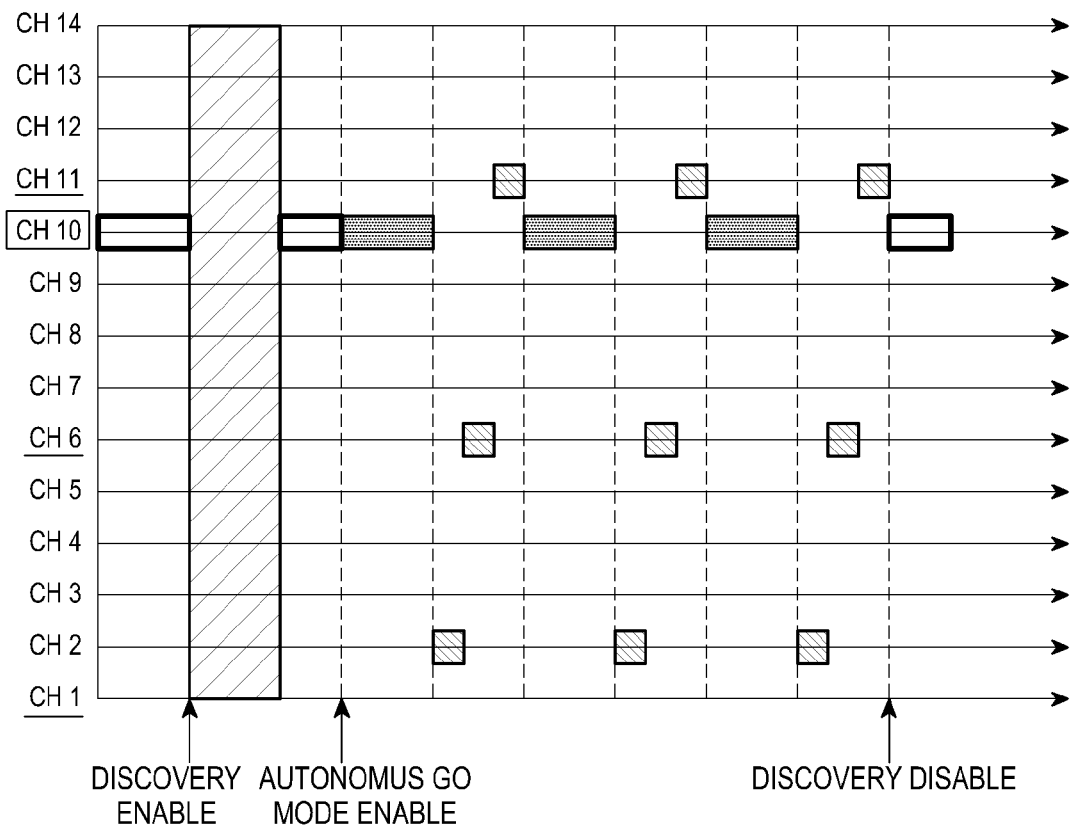
FIG. 5 illustrates a process of executing a Wi-Fi P2P function in a legacy Wi-Fi station mode according to an exemplary embodiment of the present invention.

FIG. 4 is a flowchart illustrating a process of executing a Wi-Fi P2P function in a legacy Wi-Fi station mode according to an exemplary embodiment of the present invention, and FIG. 5 illustrates a process of executing a Wi-Fi P2P function in a legacy Wi-Fi station mode according to an exemplary embodiment of the present invention. The first exemplary embodiment of the present invention corresponds to an embodiment capable of addressing the problem of the degradation in performance of the legacy Wi-Fi during execution of the Wi-Fi P2P function in the legacy Wi-Fi station mode according to the related art, which has been described in conjunction with FIG. 2, and a description thereof will be given below.

Referring to FIG. 4, in steps S401 to S403, while operating in a legacy Wi-Fi station mode, if use of a Wi-Fi P2P function is requested, a P2P device enters a device discovery process of Wi-Fi P2P.

While performing wireless data communication using the legacy Wi-Fi function, a user of a specific P2P device may request data sharing with a user of another P2P device using the Wi-Fi P2P function. The use request for the Wi-Fi P2P function may be a request made by execution of a menu or an application by a user of a specific P2P device, or may correspond to a Wi-Fi P2P connection request from another P2P device.

If use of the Wi-Fi P2P function is requested while the legacy Wi-Fi station mode is in operation, the P2P device enters a device discovery process related to P2P group creation of Wi-Fi P2P. After entering the device discovery process, the P2P device discovers its surrounding P2P devices by performing IEEE 802.11 channel scan.

In an exemplary embodiment of the present invention, the P2P device, a device capable of creating a P2P group using the Wi-Fi P2P function, includes a communication module complying with the IEEE 802.11 standard for Wireless Local Area Network (WLAN), and the communication module is assumed to have a standard of 802.11g or more (e.g., 802.11g or 802.11n) for certification of Wi-Fi Direct. Therefore, exemplary embodiments of the present invention are assumed to be realized by P2P devices that include a communication module having a standard of 802.11g or more (e.g., 802.11g or 802.11n) and have undergone Wi-Fi Direct certification.

In steps S404 and S405, the P2P device acquires GO rights by enabling Autonomous GO mode, and performs a listen state over the same channel as the channel in use in the legacy Wi-Fi station mode using the acquired GO rights.

The Wi-Fi P2P (Wi-Fi Direct) Specification defines a mode in which a P2P device may immediately acquire GO rights without the Group Owner Negotiation process described in conjunction with FIG. 2. This mode is called Autonomous GO mode.

The Autonomous GO mode performs the listen state in which a P2P device sets itself as GO and waits for a connection of another P2P device (i.e., GC in the created P2P group), such as when a P2P device should provide an AP feature by continuously playing a role of GO.

As described in conjunction with FIG. 2, the Wi-Fi P2P Specification provides that in the absence of GO rights, the listen state should be performed only over the social channels CH1, CH6 and CH11.

Therefore, in accordance with the above described exemplary embodiment of the present invention, if use of Wi-Fi P2P is requested in the legacy Wi-Fi station mode, the P2P device acquires GO rights by enabling Autonomous GO mode on the same channel as the channel in use in the legacy Wi-Fi station mode, thereby acquiring rights to select the channel where it will perform the listen state. If GO rights are acquired through enabling of Autonomous GO mode, the P2P device is allowed to perform the listen state over the same channel as the channel in use in the legacy Wi-Fi station mode.

By enabling Autonomous GO mode over the same channel as that in the legacy Wi-Fi station mode in this way, the P2P device may execute the legacy Wi-Fi station mode while performing the listen state during the period of Autonomous GO mode. In other words, by enabling Autonomous GO mode over the same channel as that in the legacy Wi-Fi station mode, the P2P device may perform both transmission and reception-related operations of the legacy Wi-Fi station mode, while sending a Probe Response message to a Probe request message from an external P2P device. The reason why this is possible is because the Wi-Fi standard is based on competition, Autonomous GO mode and legacy Wi-Fi station mode may operate together on condition that they use the same channel.

Therefore, if Autonomous GO mode is enabled over the same channel as that in the legacy Wi-Fi station mode, the legacy Wi-Fi station mode is operable while the listen state based on Autonomous GO mode is performed, making it possible to address the problems or Quality of Service (QoS) problems that the legacy Wi-Fi station mode is disconnected, which may occur during execution of the Wi-Fi P2P function in the legacy Wi-Fi station mode.

In steps S406 to S408, the P2P device performs the search state over the social channels CH1, CH6 and CH11 defined in the Wi-Fi P2P Specification, repeats the search and listen states in a predetermined period until the device discovery process is ended, and disables Autonomous GO mode if the device discovery process is ended.

The search state is performed in substantially the same method as described in connection with FIG. 2. This is to allow the above described exemplary embodiment of the present invention to operate in accordance with the device discovery process defined by the Wi-Fi P2P Specification, thereby maintaining compatibility. Therefore, in the above described exemplary embodiment of the present invention, the P2P device performs the search state over the social channels CH1, CH6 and CH11. The period of the periodic search state is assumed to have a time period of 100 to 300 ms defined in the Wi-Fi P2P Specification.

Steps S401 to S408 will be described once again with reference to FIG. 5. Upon request to use the Wi-Fi P2P function, the P2P device, which was performing the legacy Wi-Fi station mode over CH10, discovers its surrounding P2P devices using the IEEE 802.11 scan method.

Thereafter, the P2P device determines the channel in use by the legacy Wi-Fi station mode while maintaining the legacy Wi-Fi station mode, for a predetermined time, enables Autonomous GO mode over the same channel (i.e., CH10) as the channel in use by the legacy Wi-Fi station mode, and performs the listen state during a period of Autonomous GO mode.

As shown in FIG. 5, from the timing 'Autonomous GO mode enable' on, where Autonomous GO mode is enabled, the listen state needed for Device Discovery of Wi-Fi P2P and the legacy Wi-Fi station mode may be performed simultaneously. Thereafter, the P2P device alternately performs the search state based on the social channels CH1, CH6 and CH11, and the Autonomous GO mode based on the CH10, until the device discovery process is ended.

Figure 6:
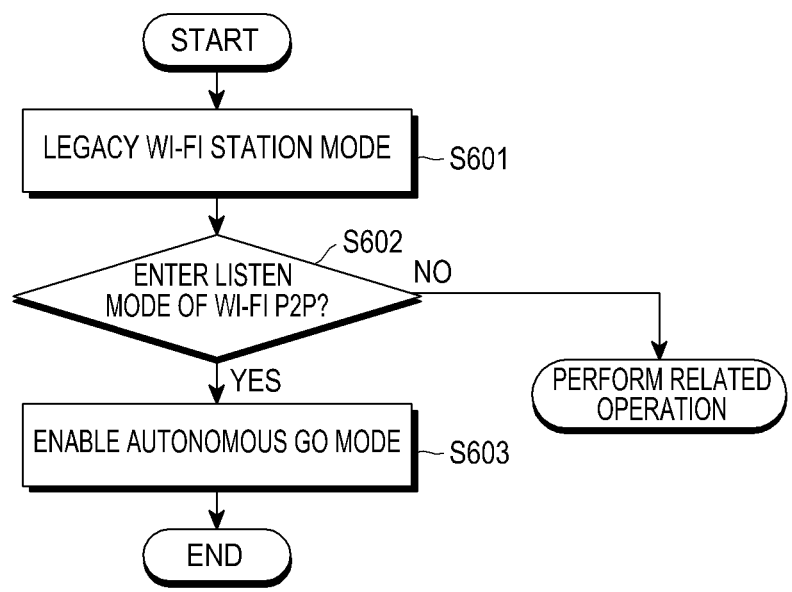
FIG. 6 is a flowchart illustrating a process of executing a Wi-Fi P2P function in a legacy Wi-Fi station mode according to an exemplary embodiment of the present invention.
Figure 7:
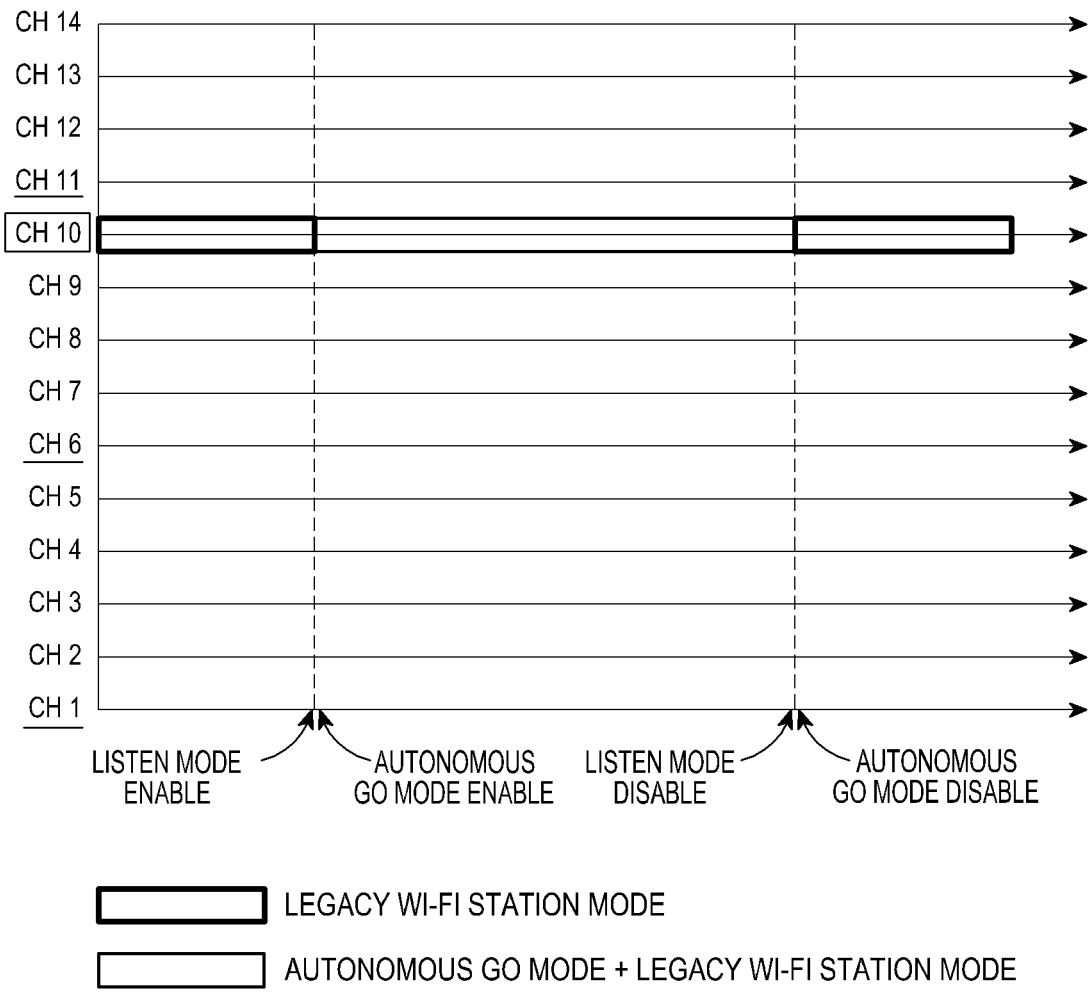
FIG. 7 illustrates a process of executing a Wi-Fi P2P function in a legacy Wi-Fi station mode according to an exemplary embodiment of the present invention.

FIG. 6 is a flowchart illustrating a process of executing a Wi-Fi P2P function in a legacy Wi-Fi station mode according to an exemplary embodiment of the present invention, and FIG. 7 illustrates a process of executing a Wi-Fi P2P function in a legacy Wi-Fi station mode according to an exemplary embodiment of the present invention. The below described exemplary embodiment of the present invention corresponds to an embodiment capable of addressing the problem of the degradation in performance of legacy Wi-Fi during execution of the Wi-Fi P2P function in the legacy Wi-Fi station mode according to the related art, which has been described in conjunction with FIG. 3, and a description thereof will be given below.

Referring to FIG. 6, in steps S601 to S603, if an entry into the listen mode of Wi-Fi P2P is requested while the legacy Wi-Fi station mode is executed, a P2P device enters the listen mode by enabling Autonomous GO mode over the same channel as that in use by the legacy Wi-Fi station mode.

This exemplary embodiment of the present invention addresses the problem of the degradation in performance of legacy Wi-Fi during enabling of the listen mode in the legacy Wi-Fi station mode, which has been described in conjunction with FIG. 3. As described in conjunction with FIG. 3, the Wi-Fi P2P Specification provides that if the P2P device is not set as GO, even the listen mode should use the social channels CH1, CH6 and CH 11. Hence, the performance of legacy Wi-Fi may be degraded when the channels in use by the legacy Wi-Fi station mode are different from the channels in use by the listen mode.

Therefore, this exemplary embodiment provides a method of entering the listen mode by enabling Autonomous GO mode of the P2P device in the same channel as that in use by the legacy Wi-Fi station mode, in entering the listen mode while the legacy Wi-Fi station mode is in use.

In accordance with this exemplary embodiment, the P2P device may cope with a Wi-Fi P2P connection request from another P2P device, while continuously performing data Transmission and Reception (TX/RX) of the legacy Wi-Fi station mode.

This exemplary embodiment will be described once again with reference to FIG. 7. If an entry into the listen mode is requested while the legacy Wi-Fi station mode is performed over CH10, the P2P device enters the listen mode by enabling Autonomous GO mode over the same CH10.

As described above, because GO rights are acquired if Autonomous GO mode is enabled, the P2P device may switch an operating channel of the listen mode. Thus, the P2P device may control the listen mode to be operated on the CH10.

Therefore, in the state where Autonomous GO mode is enabled (i.e., the listen mode is in progress in the same channel as that in the legacy Wi-Fi station mode), the legacy Wi-Fi station mode and the listen mode may operate together due to the competition-based Wi-Fi standard, making it possible to address the problems of the related art in which the legacy Wi-Fi station mode is degraded in performance or interrupted upon entry into the listen mode.

In this exemplary embodiment, if the period where Autonomous GO mode is enabled (i.e., the period where the listen mode is in progress in the same channel as that in the legacy Wi-Fi station mode) is very long or lasts for a long time, connectivity with another P2P device may improve advantageously, but the power consumption may increase disadvantageously.

Therefore, in this exemplary embodiment, the listen mode may be repeated in a predetermined sleep period, which uses an Opportunistic Power Save method proposed in the Wi-Fi P2P Specification. The Opportunistic Power Save method, which is a power management mechanism proposed by the Wi-Fi P2P Specification, is a method in which, when a P2P group is created by the Wi-Fi P2P function, the P2P device corresponding to GO in the created P2P group enters a sleep mode if there is no data traffic between GO and GC.

In other words, in this exemplary embodiment, the listen mode may ensure a connection with another P2P device by releasing the sleep mode (or power-saving mode) in a period set as Client Traffic Window (CTWindow) in the period set for the sleep mode, even though the P2P device is in the sleep mode based on the Opportunistic Power Save function. A period of CTWindow may be less than a Target Beacon Transmission Time (TBTT), which is an interval where a beacon is transmitted, and greater than or equal to a minimum of 10 TU (about 10 ms), or may be about a half of the TBTT period.

As is apparent from the foregoing description, exemplary embodiments of the present invention have a primary effect of addressing the problem that performance of legacy Wi-Fi is degraded if the Wi-Fi P2P function is used while the legacy Wi-Fi function is in use.

By the primary effect of exemplary embodiments of the present invention, a secondary effect may be expected that can relieve the inconveniences that the P2P device should selectively use only the Wi-Fi P2P function after stopping the legacy Wi-Fi function, due to the problem that performance of legacy Wi-Fi is degraded if the Wi-Fi P2P function is used while the legacy Wi-Fi function is in use.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method comprising:
   obtaining, while operating an electronic device via a first network, a Group Owner (GO) right in relation with operating the electronic device via a second network;
   determining, based on the GO right, whether a request is received in relation with the second network via a channel of the first network; and
   operating the electronic device via the second network while the electronic device is operable to perform a function of the first network.

2. The method of claim 1, wherein the channel of the first network comprises a channel via which the function of the first network is performed.

3. The method of claim 1, wherein the operating while connected to the first network comprises receiving a request to connect to the second network from a user or another electronic device.

4. The method of claim 1, wherein the function comprises a communication function by being connected to a specific Access Point (AP).

5. The method of claim 1, wherein the first network comprises a legacy Wi-Fi network.

6. The method of claim 1, wherein the second network comprises a Wi-Fi P2P network providing a direct communication among Wi-Fi devices.

7. The method of claim 1, wherein the operating the electronic device simultaneously via the first network and the second network comprises searching a device using the second network via a social channel.

8. The method of claim 1, wherein the request comprises at least one of a P2P Information Element (IE), a Wi-Fi simple Configuration (WSC) IE and a Supplemental Registration (Supp Reg) IE.

9. The method of claim 1, wherein the operating comprises receiving the request from a user or another electronic device.

10. The method of claim 1, wherein the operating comprises connecting with an external device.

11. An apparatus comprising:
    a communication module;
    a controller operatively coupled with the communication module, the controller configured to:
    obtain, while operating an electronic device via a first network, a Group owner (GO) right in relation with operating the electronic device via a second network;
    determine, based on the GO right, whether a request is received in relation with the second network via a channel of the first network; and
    operate the electronic device via the second network while the electronic device is operable to perform a function of the first network.

12. The apparatus of claim 11, wherein the controller is further configured to perform wireless data communication using the first network during execution of a function of the second network.

13. The apparatus of claim 12, wherein the controller is further configured to operate in a power saving mode.

14. The apparatus of claim 11, wherein the controller is further configured to enter a device discovery process of the second network, when a function using the second network is requested.

15. The apparatus of claim 11, wherein the controller is further configured to:
    enable an Autonomous GO mode.

16. The apparatus of claim 11, wherein the controller is further configured to acquire the right over the same channel as a channel where the first network is in use.

17. The apparatus of claim 16, wherein the controller is further configured to move to Autonomous GO mode to receive a connection request from an external device, based on the right.

18. The apparatus of claim 11, wherein the controller is further configured to enter a sleep mode when there is no data traffic in at least one of the first network or the second network.

19. The apparatus of claim 11, wherein the controller is further configured to perform a channel scanning process.

20. A method comprising:
    determining, while an electronic device is operating in a first network mode, whether to operate the electronic device in a second network mode;
    obtaining a Group Owner (GO) right in relation with the second network mode; and
    performing a function of the second network mode via a same channel as a channel used for the first network mode.

21. The method of claim 20, wherein the first network mode comprises a legacy Wi-Fi network mode.

22. The method of claim 20, wherein the second network mode comprises a Wi-Fi P2P network mode providing a direct communication among Wi-Fi devices.

* * * * *